United States Patent [19]

Nelson et al.

[11] Patent Number: 4,651,457
[45] Date of Patent: Mar. 24, 1987

[54] DECOY

[75] Inventors: Robert D. Nelson, Tamarack; Thomas E. Nelson, Erhard; Paul M. Williams, Minneapolis, all of Minn.

[73] Assignee: Advance Scouts, Inc., Roseville, Minn.

[21] Appl. No.: 865,265

[22] Filed: May 20, 1986

[51] Int. Cl.⁴ .......................................... A01M 31/06
[52] U.S. Cl. ........................................................ 43/3
[58] Field of Search .......................................... 43/2, 3

[56] References Cited

U.S. PATENT DOCUMENTS

| | | | |
|---|---|---|---|
| 508,818 | 11/1893 | Curlin | 43/3 |
| 1,066,587 | 7/1913 | Cunningham | 43/3 |
| 1,316,566 | 9/1919 | Fauble | 43/3 |
| 2,885,813 | 5/1959 | Kratzert | 43/3 |
| 3,707,798 | 1/1973 | Tryon | 43/3 |
| 4,062,141 | 12/1977 | Shjeflo | 43/3 |
| 4,318,240 | 3/1982 | Hillesland | 43/3 |
| 4,435,913 | 3/1984 | Messina | 43/3 |

Primary Examiner—M. Jordan
Attorney, Agent, or Firm—Burd, Bartz & Gutenkauf

[57] ABSTRACT

A weather vane-type rotatable inflatable wild fowl decoy. The decoy includes a relatively rigid or semi-flexible head and neck portion adapted to be rotatably supported by a spindle stuck in the earth, and an inflatable bag body adapted to be secured to the head and neck portion for rotation therewith. The decoy may be set up in the field in standing or sentry position and also in bent-over feeding or landing position. The body is imprinted with a non-reflective, mattefinish pattern simulating a species of wild fowl desired to be lured by the decoy. Specific means for mounting the decoy head on a spindle are disclosed, along with specific fastening means for securing the body. Preferably the spindle has some springiness or slight flexibility.

17 Claims, 11 Drawing Figures

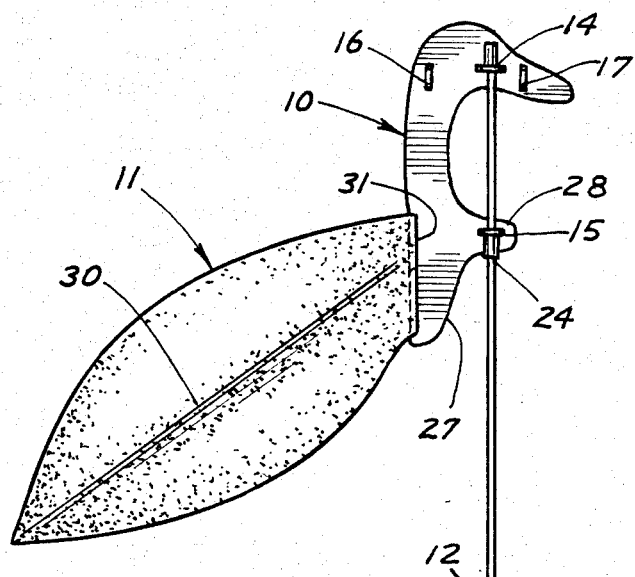
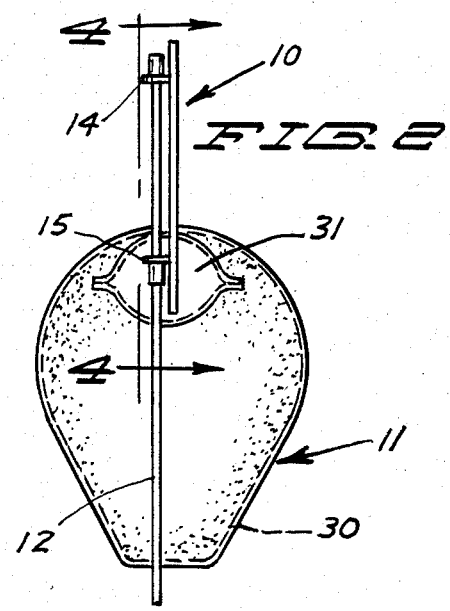
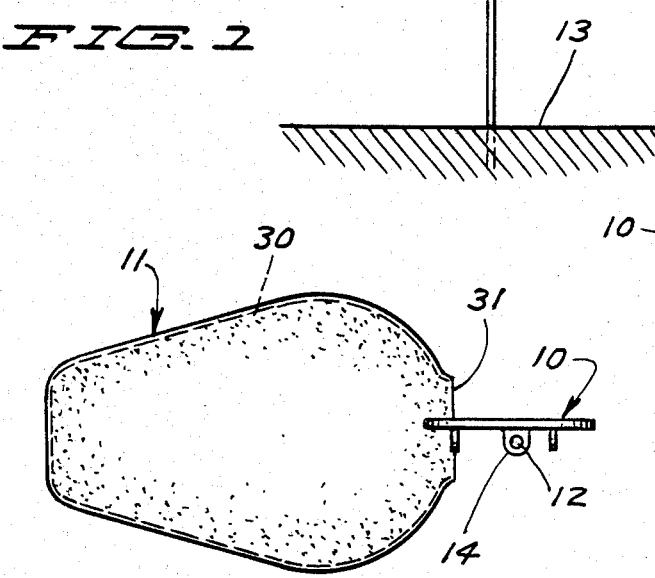
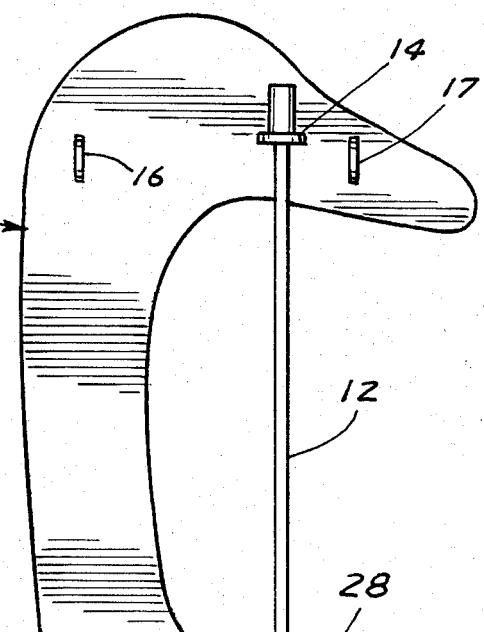
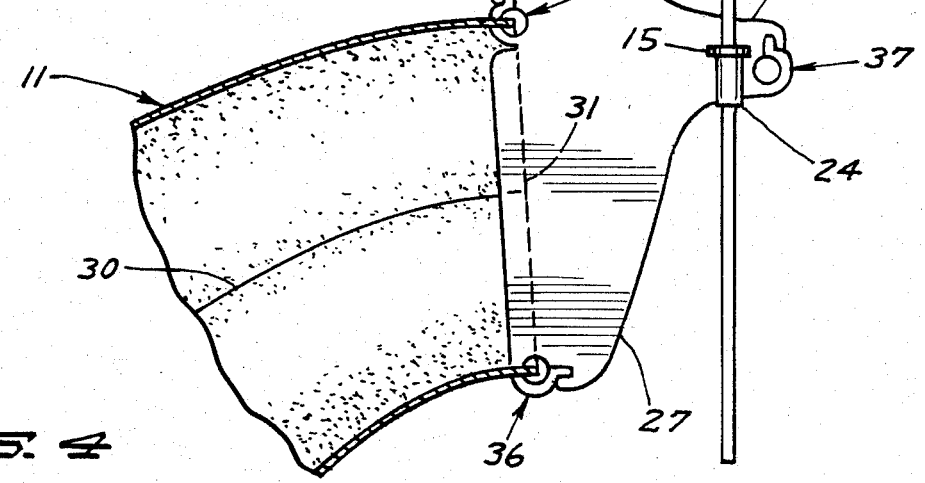

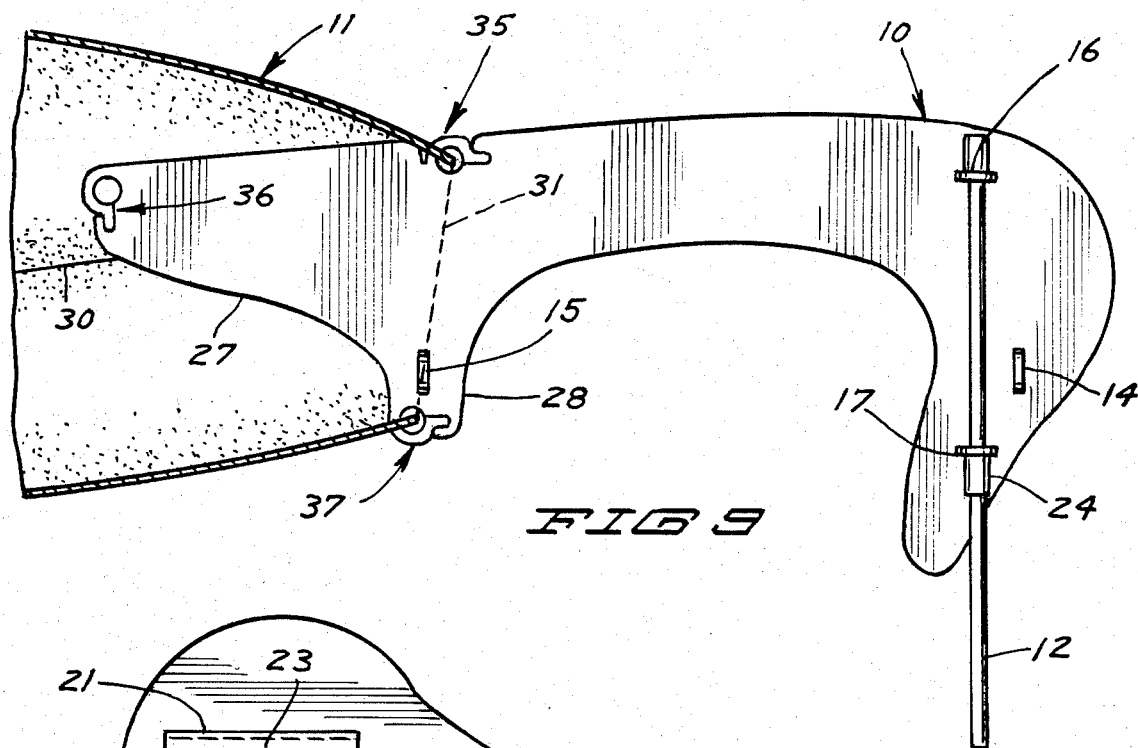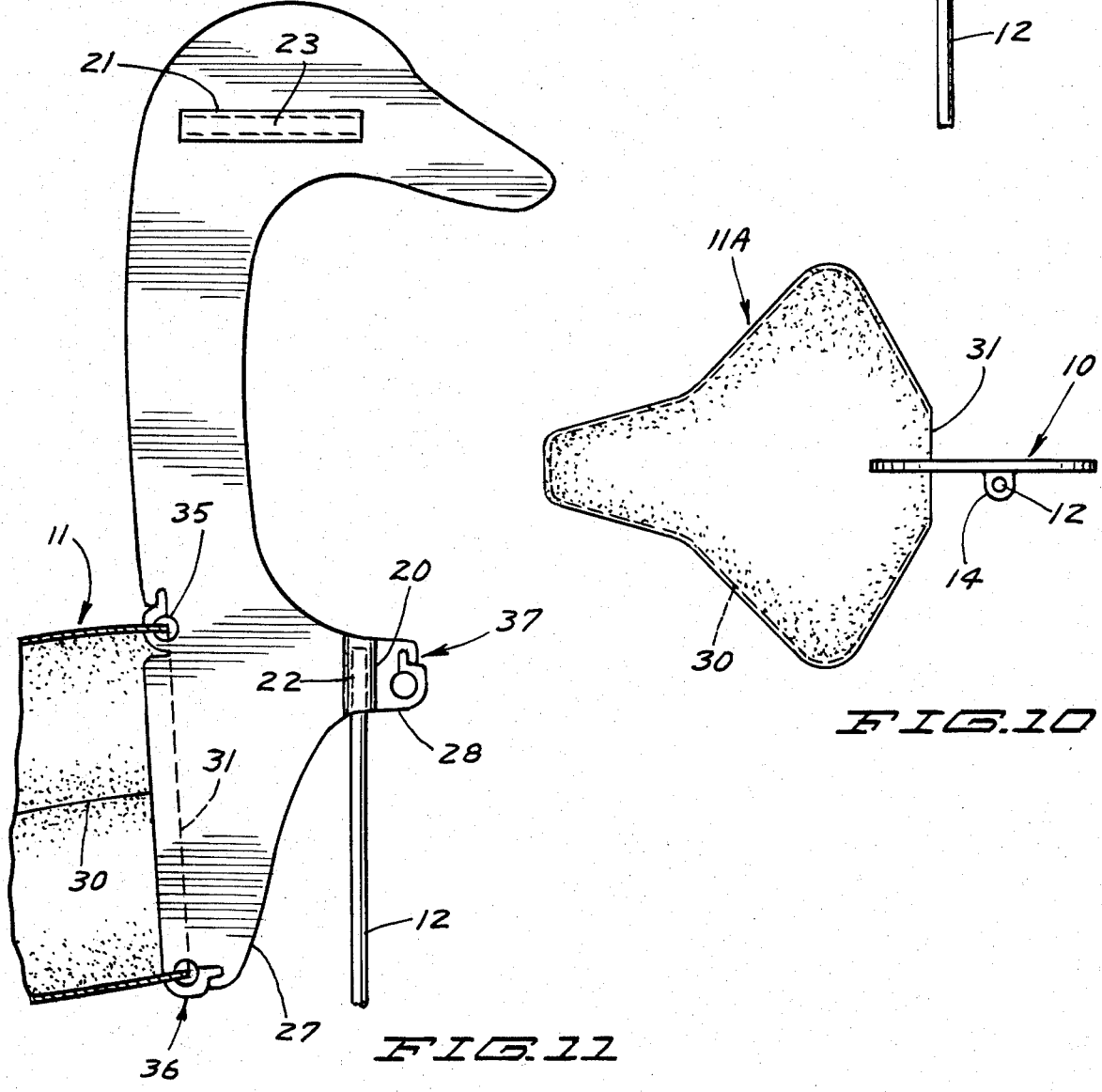

1

DECOY

FIELD OF THE INVENTION

BACKGROUND OF THE INVENTION

This invention relates to a new and improved inflatable weather vane-type wild fowl decoy for use by hunters. More particularly, the invention relates to a wind inflatable weather vane-type wild fowl decoy in the form of a goose or duck which is of simple construction for easy manufacture, transport and assembly, and which is especially adapted for use in the field in sentry and feeding and landing positions, in simulation of natural wild fowl.

Decoys have been used for many years by hunters to attract wild fowl. Originally such decoys were carved from wood, but these had the disadvantage of being bulky and heavy and difficult to transport for field use. They were expensive. These factors tended to limit the number of decoys which could be used. Subsequently techniques were devised to manufacture hollow decoys. This partially resolved the weight and expense problems, but the decoys remained bulky and cumbersome to carry. These disadvantages led to the development of inflatable decoys.

THE PRIOR ART

Exemplary inflatable decoys are represented by the following prior art patents:
Curlin U.S. Pat. No. 512,810; Jan. 16, 1894
Kramer U.S. Pat. No. 747,732; Dec. 22, 1903
Timm et al U.S. Pat. No. 2,483,680; Oct. 4, 1949
Fox U.S. Pat. No. 2,564,890; Aug. 21, 1951
Shjeflo U.S. Pat. No. 4,062,141; Dec. 13, 1977

SUMMARY OF THE INVENTION

The decoy of the present invention represents an improvement over the decoys of the prior art. Broadly stated, the decoy of the present invention comprises a relatively rigid or semi-flexible head and neck portion, a flexible inflatable body portion attached to the neck portion thereof, and a spindle or stake attached to the head and neck portion. The body portion is a thin film bag which, when inflated, simulates the body of a wild fowl and has an open forward end. The neck and head portion of the decoy simulates the head and neck of a wild fowl and has a first extension projecting downwardly from the bottommost end of the neck portion and a second extension projecting forwardly therefrom. A first bag attaching means is located adjacent to the top rearward edge of the first extension and a second bag attaching means is located adjacent to the bottommost edge of that first extension. A third bag attaching means is located adjacent the forward edge of the second extension. The distance between each pair of bag attaching means is approximately the diameter of the open forward end of the bag. The head and neck portion of the decoy is provided with two sets of spindle engaging means, the first for staking out the decoy in the field in an upright or sentry position, and the other for staking out the decoy in bent-over or feeding or landing position. Specific bag attachment means and spindle engaging means are disclosed.

BRIEF DESCRIPTION OF THE DRAWINGS

The invention is illustrated by the accompanying drawings in which corresponding parts are identified by the same numerals and in which:

FIG. 1 is a side elevation of one form of decoy according to the present invention;

FIG. 2 is a front elevation thereof;

FIG. 3 is a top plan view thereof;

FIG. 4 is a fragmentary section on the line 4–4 of FIG. 2 and in the direction of the arrows;

FIG. 9 is a fragmentary eleation similar to FIG. 4 but showing the decoy arrayed in a different position;

FIG. 10 is a top plan view showing an alternative form of body bag design; and

FIG. 11 is a fragmentary section similar to FIG. 4 showing an alternative spindle or stake engaging means.

DETAILED DESCRIPTION OF THE PREFERRED EMBODIMENT

Figure 5:
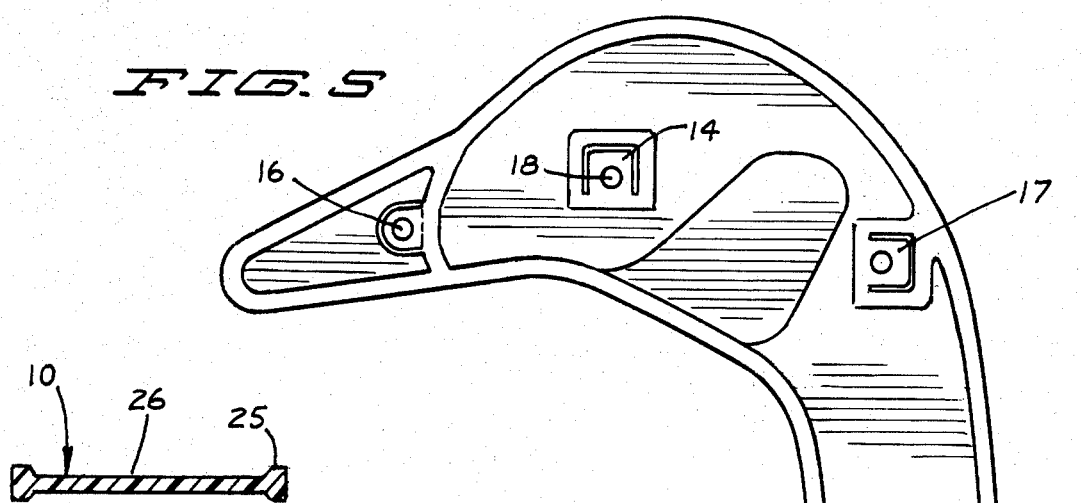
FIG. 5 is a detailed elevation of a preferred form of decoy head and neck portion.

Referring now to the drawings, there is shown a weather vane-type wild fowl decoy according to the present invention comprised of a head and neck portion, indicated generally at 10, an inflatable body portion, indicated generally at 11, and a spindle or stake 12. The head and neck portion 10 is generally flat and has the profile of the head and neck portion of the species of wild fowl desired to be lured by the decoy. The body 11, when inflated, has generally the configuration of the body of the corresponding desired species of water fowl. Spindle 12 is intended to be disposed vertically with its bottommost end stuck into the earth 13 a sufficient distance to maintain the spindle stably, and the head and neck portion of the decoy is supported at the upper end of the spindle for rotation therearound.

The decoy may be attached to the spindle by one of several means. For stability, the spindle should be engaged at at least two longitudinally spaced apart points along the spindle. This attachment may be by means of spaced apart tabs or ears having passages therethrough, or by means of a socket having a single elongated passage therein. For example, for setting a decoy in standing or sentry position, the decoy head and neck portion engages the spindle through a pair of spaced apart tabs or ears 14 and 15 extending outwardly from the side of the head and/or neck portion. As best seen in FIG. 5, each tab or ear 14–17 has a circular cross section passage 18 of diameter slightly greater than the diameter of spindle 12 such that the spindle fits in the passage loosely to permit free rotation thereabout.

A stop 24 is provided below the lowermost ear or tab to keep the decoy from sliding down the spindle. This may be in the form of a segment of flexible tubing gripping the spindle. Preferably a cap is provided at the top end of the spindle.

In FIG. 10, there is shown an alternative spindle engaging means in the form of sockets 20 and 21 for setting the decoy in sentry and feeding positons, respectively. Sockets 20 and 21 have longitudinal circular cross sectional passages 22 and 23, respectively, for loosely engaging the top of the spindle 12. The longitudinal axis of the spindle engaging means for the feeding position is approximately perpendicular to the longitudinal axis of the spindle engaging means for the sentry position.

Although stiff and relatively rigid in order to stably maintain the decoy upright, even in the face of a stiff wind, the spindle or stake 12 desirably has limited flexibility or springiness. This limited flexibility may be inherent in the material from which the spindle is formed. Alternatively, the spindle may be formed in two parts interconnected by a spring, such as a relatively stiff helical coil spring, press fit or otherwise attached to the ends of the spindle parts, a leaf spring, a torsion bar, an elastomeric member, or the like. The partial flexibility of the spindle introduces additional slight movement to the decoy in the wind further simulating natural movement of wild fowl.

Figure 6:
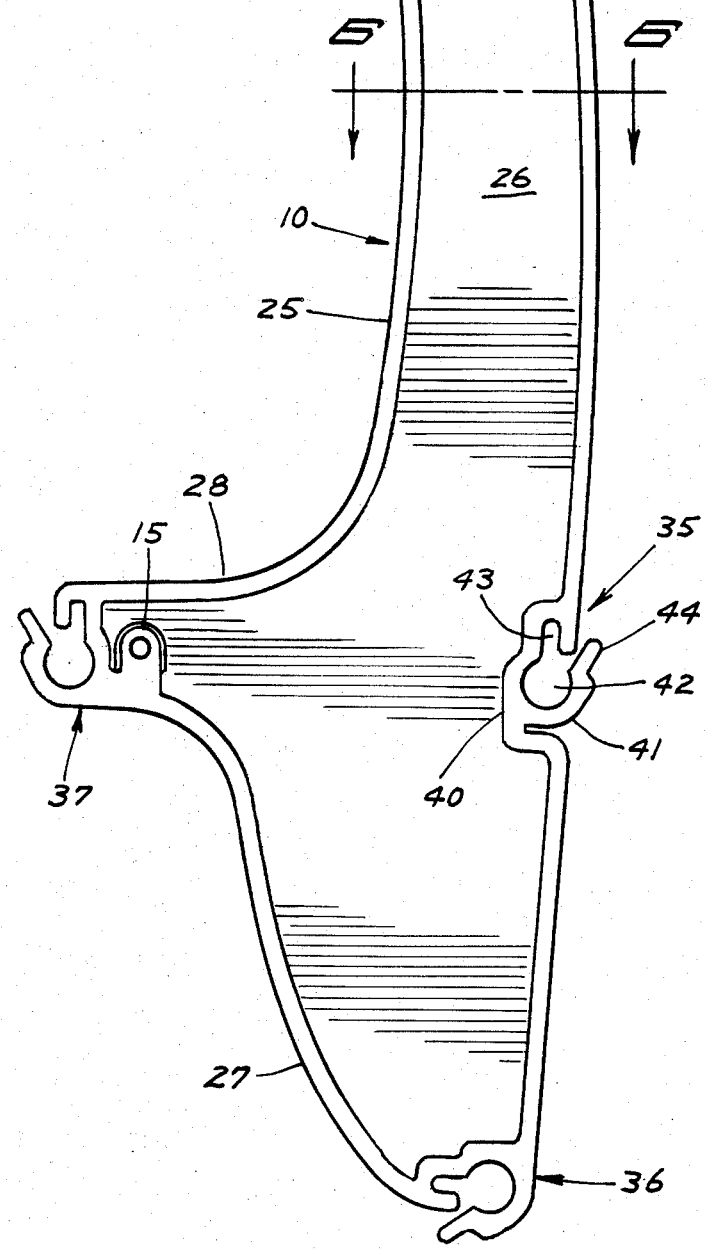
FIG. 6 is a section on the line 6—6 and in the direction of the arrows.
Figure 7:
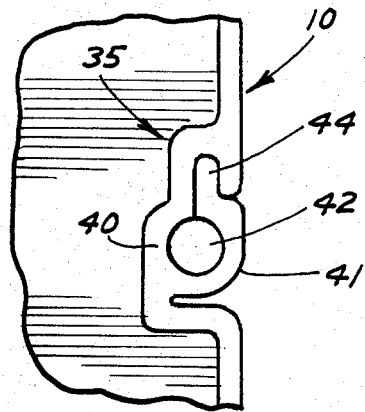
FIG. 7 is a partial elevation showing a preferred form of bag attaching means in closed position.

A preferred form of decoy head and neck portion 10 is shown in FIGS. 5 through 7. This head and neck portion is designed to be formed by molding from any of the many suitable synthetic resinous plastic materials which are commercially available. Polypropylene is preferred. As shown, the head and neck are generally flat and in the form of the silhouette of a wild fowl. For maximum strength with minimum weight, it preferably has a reinforcing head or flange 25 around its edge with a web 26 of lesser thickness therebetween.

A first extension 27 projects downwardly from the bottommost end of the neck portion and a second extension 28 projects forwardly from the bottommost end of the neck portion. Spindle engaging tab 14 is formed in the head, and spindle engaging tab 15 is formed in the second extension 28, each being adapted to be folded or bent out from the web of the decoy head to permit engagement with the spindle. Spindle engaging tabs 16 and 17 are similarly formed in the head portion, spaced so that tab 14 does not interfere with insertion of the spindle. In one form of the invention a flat cap on the top of spindle 12 partially engages the recess formed when tab 14 is folded out and functions as a stop to prevent the decoy from sliding down the spindle.

Although desirably formed from synthetic resinous plastic by molding, the head and neck portion may alternatively be die-cut from plastic sheeting having suitable characteristics, or from sheet metal, such as aluminum sheeting, or the like.

The bag 11 forming the decoy body when inflated is preferably formed from two substantially identical pieces of flexible synthetic resinous sheeting heat sealed or otherwise secured around the periphery to form a seam 30, except for an opening 31 at one end thereof. The bag 11 may be formed from any of a wide variety of commercially available sheet or film materials, such as synthetic resinous plastics available in sheet form, woven or non-woven fiber sheets, or the like. Polyethylene or polystyrene are preferred materials. The bag is provided with a pattern simulating that of a particular species of wild fowl desired to be lured by the decoy. This pattern is imprinted, preferably using a non-reflective matte finish ink.

The bag 11 may be attached to the head and neck portion 10 by a variety of means. The head and neck portion may be directly adhesively secured within the bag opening 31, or the bag may be secured by means of tapes. A ball and socket or plug and socket type clamp may be used. Preferably, however, the bags are attached by use of hook-like fasteners to permit change of location of the bag relative to the head and neck portion so as to permit setting of the decoy in either sentry or feeding or landing positions. These hook-like fasteners may be simple open-end hooks formed in the edge of the head and neck portion of the decoy.

A preferred form of flexible closable hook is shown in FIGS. 5 and 7. A first flexible hook 35 is located at the base of the neck adjacent to the top rearward edge of the first downwardly projecting extension 27. A second similar hook member 36 is located adjacent the bottommost edge of that first extension. A third similar flexible hook 37 is located adjacent the forward edge of the second extension 28 projecting forwardly from the base of the neck. The hooks 35, 36 and 37 are similar in construction, shown and described in detail with respect to hook member 35.

Each hook member includes a relatively rigid portion 40 formed within the extensions, and an integral relatively flexible portion 41. Together these elements define an openmouthed loop having a central opening 42 therein. A connecting recess 43 in the relatively rigid portion 40 is adjacent to the open mouth of the loop and communicates with the central opening 42. A projecting lip 44 on the free end of the flexible portion 41 of the hook-like element engages recess 43, as best shown in FIG. 7, when the hook is closed. The bag 11 is engaged by inserting the flexible portion of the hook through a hole adjacent the top center edge of the bag opening 31 and then inserting the lip 44 into the recess 43 to securely hold the bag.

The hook members 35-37 are approximately equidistant from one another by a distance which is less than half the circumference of the open forward end 31 of bag 11 sufficient to permit the head and neck portion of the decoy to engage the bag within the open mouth. This causes the mouth to gape open, as shown in FIG. 2. As shown, for example, in FIGS. 4 and 10, when the decoy is to be set in sentry position the bag is engaged by the first two hook-like members 35 and 36. However, as shown in FIG. 8, when the decoy is to be set in feeding or landing position, the bag is secured to hook members 35 and 37.

Figure 8:
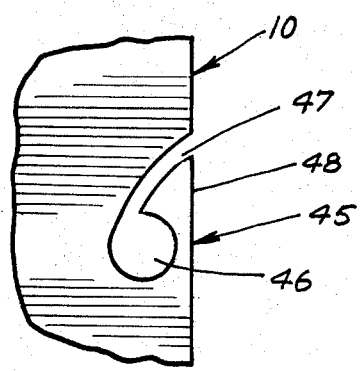
FIG. 8 is a similar partial elevation showing an alternative form of bag attaching means.

FIG. 8 shows an alternative form of hook 45. A passage 46 through the neck portion of the decoy and an open channel 47 define a hook or barb element 48 by which the edge of the bag body may be engaged and firmly held by sliding the edge of the bag through channel 47 into passage 46.

An alternative form of bag 11A is shown in FIG. 9. This form of bag has extending wing-like portions in simulation of a wild fowl alighting after flight. This form of bag may be utilized in conjunction with a head and neck in feeding position to simulate a wild fowl landing, to contribute variety to an array of decoys set in a field.

The decoy of the present invention functions aerodynamically similar to a weather vane. When the decoy is set out in the field, the open mouth 31 of the bag 11 catches and entraps the wind to inflate the body. Because the body neck and head are freely rotatable about the spindle 12, the decoy rotates in response to slight changes in wind direction. The result is that a field of decoys is in almost constant motion, even under very mild wind conditions, effectively simulating the action of a flock of wild fowl.

It is apparent that many modifications and variations of this invention as hereinbefore set forth may be made without departing from the spirit and scope thereof.

The specific embodiments described are given by way of example only and the invention is limited only by the terms of the appended claims.

The embodiments of the invention in which an exclusive property or privilege is claimed are defined as follows:

1. A decoy comprising a relatively rigid or semi-flexible head and neck portion, a flexible inflatable body portion attached to the neck portion thereof, and a spindle attached to said head and neck portion,
   (A) said body portion being a thin film bag of an inflated shape simulating the body of a wild fowl and having an open forward end,
   (B) said head and neck portion simulating the head and neck of a wild fowl and having
      (1) a first extension projecting downwardly from the bottommost end of the neck portion,
         (a) a first bag attaching means for engaging the top center edge of the bag opening and located adjacent the top rearward edge of said first extension,
         (b) a second bag attaching means for engaging the bottom center edge of the bag opening and located adjacent the bottommost edge of said first extension, the distance between said first and second bag attaching means being less than half the circumference of the open forward end of the bag,
      (2) a second extension projecting forwardly from the bottommost end of the neck portion, and
      (3) first spindle engaging means adjacent the forward edge of said second extension.

2. A decoy according to claim 1 wherein
   (A) a third bag attaching means for engaging the bottom center edge of the bag opening is provided adjacent the forward edge of said second extension, the distance between said first and third bag attaching means being less than half the circumference of the open forward end of the bag, and
   (B) second spindle engaging means is provided on the head portion, the longitudinal axis thereof being approximately perpendicular to the longitudinal axis of the first spindle engaging means.

3. A decoy according to claim 1 wherein said bag attaching means are hook-like elements.

4. A decoy according to claim 3 wherein said bag attaching means are partially flexible hook-like elements, each comprising:
   (A) a relatively rigid portion and a relatively flexible portion integral therewith and together defining an open-mouthed loop having a central opening therein,
   (B) a recess in the relatively rigid portion of the hook-like element adjacent to the open-mouth of the loop and connected to the central opening therein, and
   (C) a projecting lip on the end of the flexible portion of the hook-like element engageable in said recess when the loop is closed.

5. A decoy according to claim 2 wherein said bag attaching means are hook-like elements.

6. A decoy according to claim 5 wherein said bag attaching means are partially flexible hook-like elements, each comprising:
   (A) a relatively rigid portion and a relatively flexible portion integral therewith and together defining an open-mouthed loop having a central opening therein,
   (B) a recess in the relatively rigid portion of the hook-like element adjacent to the open-mouth of the loop and connected to the central opening therein, and
   (C) a projecting lip on the end of the flexible portion of the hook-like element engageable in said recess when the loop is closed.

7. A decoy according to claim 1 wherein said spindle engaging means comprises at least one circular cross-section passage receiving a circular cross-section spindle of lesser diameter and engaging said spindle at at least two longitudinally spaced points adjacent the upper end of the spindle, whereby the body and head and neck portions of the decoy may rotate about the longitudinal axis of the spindle.

8. A decoy according to claim 7 wherein
   (A) said spindle engaging means comprises at least two laterally projecting ears extending from one side of the head and neck portion,
   (B) said ears each have a circular cross-section passage extending therethrough, and
   (C) said passages are spaced apart and lie along a common longitudinal axis.

9. A decoy according to claim 7 wherein said spindle engaging means comprises an elongated socket-like passage of circular cross-section formed within the head and neck portion.

10. A decoy according to claim 2 wherein said spindle engaging means comprises at least one circular cross-section passage receiving a circular cross-section spindle of lesser diameter and engaging said spindle at at least two longitudinally spaced points adjacent the upper end of the spindle, whereby the body and head and neck portions of the decoy may rotate about the longitudinal axis of the spindle.

11. A decoy according to claim 10 wherein
   (A) said spindle engaging means comprises at least two laterally projecting ears extending from one side of the head and neck portions,
   (B) said ears each have a circular cross section passage extending therethrough, and
   (C) said passages are spaced apart and lie along a common longitudinal axis.

12. A decoy according to claim 10 wherein said spindle engaging means comprises an elongated socket-like passage of circular cross-section formed within the head and neck portion.

13. A decoy comprising a relatively rigid or semi-flexible head and neck portion, a flexible inflatable body portion attached to the neck portion thereof, and a spindle attached to said head and neck portion,
   (A) said body portion being a thin film bag of an inflated shape simulating the body of a wild fowl and having an open forward end,
   (B) said head and neck portion simulating the head and neck of a wild fowl and having
      (1) a first extension projecting downwardly from the bottommost end of the neck portion,
      (2) a first hook-like bag attaching means for engaging the top center edge of the bag opening and located adjacent the top rearward edge of said first extension,
      (3) a second hook-like bag attaching means for engaging the bottom center edge of the bag opening and located adjacent the bottommost edge of said first extension, the distance between said first and second bag attaching means being less than half the circumference of the open forward end of the bag, (4) a second extension projecting forwardly from the bottommost end of the neck portion, (5) first spindle engaging means adjacent the forward edge of said second extension comprising at least one circular cross-section passage receiving a circular cross-section spindle of lesser diameter and engaging said spindle at at least two longitudinally spaced points adjacent the upper end of the spindle, whereby the body and head and neck portions of the decoy may rotate about the longitudinal axis of the spindle, (6) a third hook-like bag attaching means for engaging the bottom center edge of the bag opening adjacent the forward edge of said second extension, the distance between said first and third bag attaching means being less than half the circumference of the open forward end of the bag, and (7) second similar spindle engaging means on the head portion, the longitudinal axis thereof being approximately perpendicular to the longitudinal axis of the first spindle engaging means.

14. A decoy according to claim 13 wherein said bag attaching means are partially flexible hook-like elements, each comprising:

(A) a relatively rigid portion and a relatively flexible portion integral therewith and together defining an open-mouthed loop having a central opening therein, (B) a recess in the relatively rigid portion of the hook-like element adjacent to the open-mouth of the loop and connected to the central opening therein, and (C) a projecting lip on the end of the flexible portion of the hook-like element engageable in said recess when the loop is closed.

15. A decoy according to claim 13 wherein said spindle engaging means comprises at least one circular cross-section passage receiving a circular cross-section spindle of lesser diameter and engaging said spindle at at least two longitudinally spaced points adjacent the upper end of the spindle, whereby the body and head and neck portions of the decoy may rotate about the longitudinal axis of the spindle.

16. A decoy according to claim 13 wherein (A) said spindle engaging means comprises at least two laterally projecting ears extending from one side of the head and neck portion, (B) said ears each have a circular cross-section passage extending therethrough, and (C) said passages are spaced apart and lie along a common longitudinal axis.

17. A decoy according to claim 1 wherein the body bag is imprinted, with a pattern simulating the appearance of a species of wild fowl to be lured by the decoy, with a non-reflective matte finish ink.

* * * * *